Sept. 1, 1936.  R. F. SYMONDS  2,052,674
MOTORIZED UNIT
Filed Oct. 23, 1934
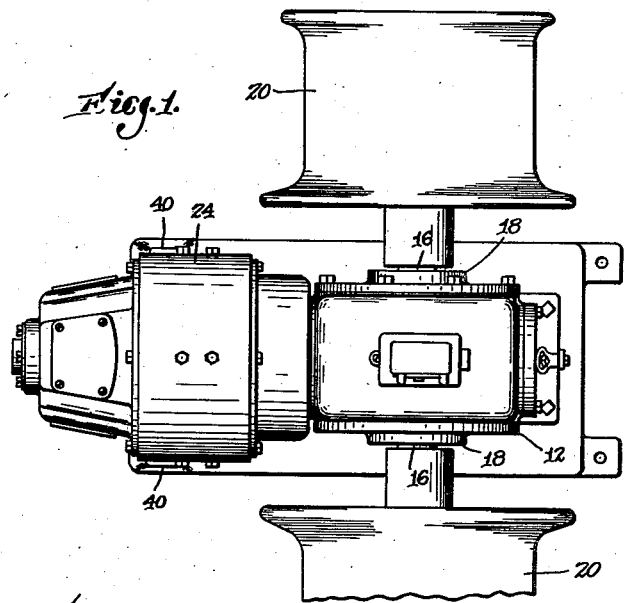
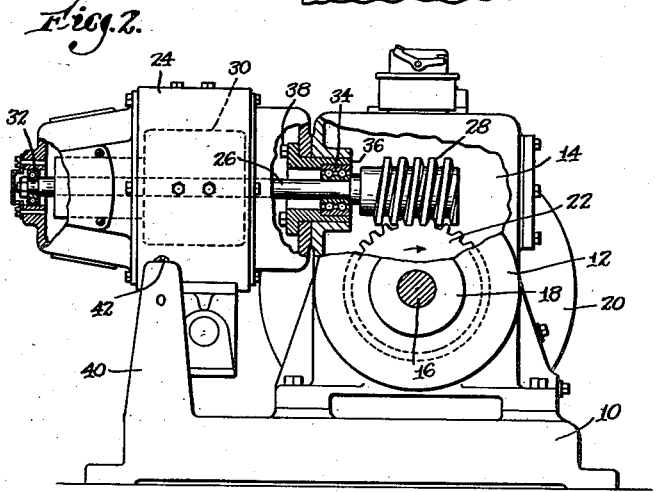
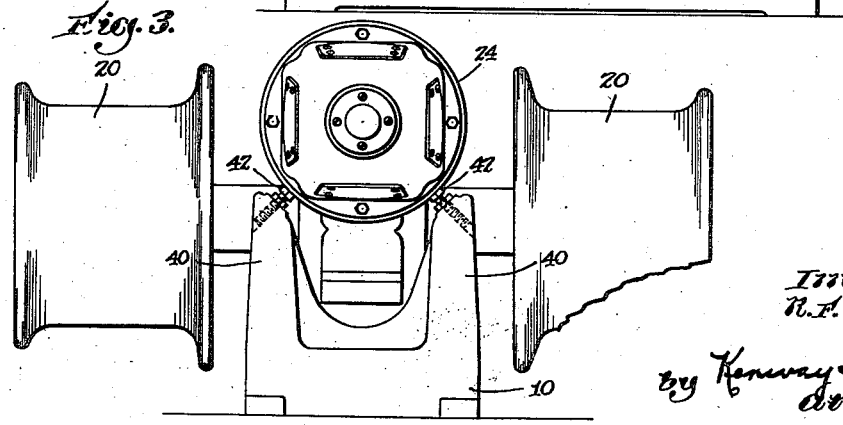
Inventor
R. F. Symonds
by Kenway & Witter
Attorneys Patented Sept. 1, 1936

2,052,674

UNITED STATES PATENT OFFICE 2,052,674

MOTORIZED UNIT

Ralph F. Symonds, Marblehead, Mass., assignor to New England Trawler Equipment Co., Boston, Mass., a corporation of Massachusetts Application October 23, 1934, Serial No. 749,681

3 Claims. (Cl. 74—425)

This invention relates to motorized hoists or the like and the primary object of the invention is to provide a more compact and substantial unit construction of this nature which will occupy a minimum of space and remain more substantially intact against exterior abuse than have like mechanisms heretofore known.

An especial application of the invention relates to marine hoists or windlasses adapted for deck or shipyard installation or wharf use. The invention is particularly useful where available space is quite limited, such as on fishing and like boats where the pounding of heavy seas and the dropping of sails and nets subjects the equipment to considerable abuse likely to result in damage thereto. In accordance with the invention, I combine the motor housing and worm housing of the device substantially into a unit and provide a shaft extending into both housings and carrying the motor armature and driving worm on opposite ends thereof, thus forming a motorized unit of minimum length and, at the same time, so compact as to be less liable to injury and capable of sustaining greater shocks with less damage.

Another feature of the invention relates to a further support for the motor at a point remote from the worm housing whereby to prevent injury to and misalignment of the driving shaft which might otherwise result from the accidental dropping of equipment onto the motor housing. This further support is preferably in the form of an upright on the base of the machine and, as illustrated in the accompanying drawing, may embody a pair of screw threaded elements threaded thereinto and adapted upon rotary adjustment to be brought into contact with the motor housing, thus fully supporting the housing against vibration and the unit against injury or misalignment. It will be understood that this construction in conjunction with the employment of a single driving shaft provides a relatively small and compact unit of great strength and utility.

These and other features of the invention will be best understood and appreciated from the following description of a preferred embodiment thereof, selected for purposes of illustration and shown in the accompanying drawing, in which—

Fig. 1 is a plan view of a motorized hoist embodying my invention;

Fig. 2 is a side elevation thereof, partially in section and partially broken away; and Fig. 3 is a rear end elevation.

Referring more specifically to the drawing, wherein I have illustrated a motorized unit comprising my invention as embodied in a hoist or windlass, 10 indicates the base on and adjacent to one end of which is mounted an upright housing 12 having a gear housing chamber 14 formed therein. A shaft 16, mounted horizontally in suitable bearings 18 in the upright, has the opposite ends thereof projecting outwardly of the housing and carrying capstan heads or drums 20 thereon. A worm wheel 22 is mounted on the shaft within the housing chamber.

Mounted in abutting relation to the gear housing 12—14 is a motor housing 24 and a shaft 26, preferably of one-piece construction as illustrated, extends into both housings. This shaft carries a worm 28 on and preferably integral with one end thereof and in mesh with the worm wheel 22, and the shaft carries the rotary armature 30 of the motor on its opposite end. The shaft 26 is supported in suitable bearings, as at 32 and 34. As illustrated, the two housings are united and held in alignment by a bushing 36 extending through and in contact with the adjacent end walls of the housings and the bearing 34 is supported within this bushing. The bushing may be held in place by bolts 38. Attention is particularly called to the fact that this construction requires less than a complete motor, the armature shaft bearing 34, bushing 36 and the housing element 37 being supplied when assembling the housings 12 and 24. Such construction not only simplifies the hoist unit, but saves the manufacturer a substantial sum when purchasing the motor since the pulley end shield, its bearing for the armature shaft and other cooperating parts usually carried by the pulley end shield are not required.

It will be apparent that the motor and gear housings are thus jointed into a compact and substantial unit occupying a minimum of space and that the motor housing overhangs a portion of the base 10. In accordance with a further feature of the invention, the unit is rendered more rugged and substantial by providing a suitable support for the overhanging motor housing. The support illustrated in the drawing comprises a U-shaped upright 40 carried by and preferably integral with the base and having two studs 42 threaded thereinto and extending inwardly toward the motor housing at an angle of 45° from the horizontal. These studs may be rotatably adjusted whereby accurately to engage the motor housing and give the desired support thereto.

Attention is particularly called to the compact and rugged construction of the unit whereby the same occupies a minimum of space and is less likely to become damaged. The motor and gear housings being directly in contact and supported as a unit permits the use of the single short shaft 26, and the support for the motor housing from the base assures that the two housings and the bearings for the shaft 26 shall remain in proper alignment.

It will also be apparent that by locating the load carrying shaft 16 beneath the driving shaft 26 the shaft 16 is at a lower elevation and more nearly adjacent to the base 10 whereby it is supported more substantially than would be the case were it located at a higher elevation. This arrangement not only saves space but also requires only two bearings 32 and 34 and eliminates the necessity for the usual shaft coupling in exposed position between the two housings. The arrangement is also preferably such that the motor and shaft 26 are located in horizontal position whereby facilitating the operation and lubrication thereof as will be readily understood. Thus is provided a more substantial and compact motorized hoist or like unit of the nature disclosed than has been known heretofore.

Having thus described my invention, what I claim as new and desire to secure by Letters Patent is:

1. In a motorized hoist or the like, the combination of a base, an upright housing supported thereon, a shaft mounted in bearings in opposite walls of the housing, a worm wheel on the shaft and within the housing, a motor adjacent to the housing and having its housing in abutting relation with and rigidly supported in horizontal position on the upright housing substantially as a unit therewith whereby the motor housing is adapted to be thus supported independently of any other support, a second shaft extending into both housings and having a worm thereon in mesh with the worm wheel and having the rotary armature of the motor mounted thereon, the second shaft and worm being located above the first shaft and worm wheel, and means auxiliarly supporting the motor housing relative to the base against external forces at a location remote from the upright housing.

2. The combination defined in claim 1, wherein the last named means embodies uprights at opposite sides of the motor housing, and screw threaded elements threaded into such uprights and having the free ends thereof in contact with the motor housing whereby to support such housing against downward and lateral thrusts.

3. In a motorized hoist or the like, the combination of a base, an upright housing supported thereon, a shaft rotatably mounted in the housing, a worm wheel on the shaft and within the housing, a motor adjacent to the housing and having its housing in abutting relation with and rigidly supported on the upright housing substantially as a unit therewith whereby the motor housing is adapted to be thus supported independently of any other support, a second shaft extending into both housings and having a worm in mesh with the worm wheel and a motor armature thereon respectively in the upright and motor housings, two bearings respectively adjacent to the junction of the two housings and at the remote wall of the motor housing rotatably supporting the second-named shaft, and means auxiliarly supporting the motor housing relative to the base and against external forces remote from the upright housing.

RALPH F. SYMONDS.